United States Patent
Ivanchykhin et al.

(10) Patent No.: US 9,185,094 B2
(45) Date of Patent: Nov. 10, 2015

(54) SYSTEMS, METHODS AND APPARATUSES FOR THE SECURE TRANSMISSION AND RESTRICTED USE OF MEDIA CONTENT

(71) Applicant: OLogN Technologies AG, Triesen/FL (LI)

(72) Inventors: Dmytro Ivanchykhin, Kiev (UA); Sergey Ignatchenko, Innsbruck (AT)

(73) Assignee: OLogN Technologies AG, Triesen/FL (LI)

( * ) Notice: Subject to any disclaimer, the term of this patent is extended or adjusted under 35 U.S.C. 154(b) by 0 days.

(21) Appl. No.: 13/780,288

(22) Filed: Feb. 28, 2013

(65) Prior Publication Data

US 2013/0230171 A1 Sep. 5, 2013

Related U.S. Application Data

(60) Provisional application No. 61/605,692, filed on Mar. 1, 2012.

(51) Int. Cl.
*H04L 29/06* (2006.01)
*H04N 21/2347* (2011.01)
(Continued)

(52) U.S. Cl.
CPC *H04L 63/08* (2013.01); *H04L 9/08* (2013.01); *H04L 9/0825* (2013.01); *H04L 9/3247* (2013.01); *H04L 9/3263* (2013.01); *H04L 63/0428* (2013.01); *H04L 63/108* (2013.01); *H04N 21/2347* (2013.01); *H04N 21/25816* (2013.01); *H04N 21/4108* (2013.01); *H04N 21/4122* (2013.01); *H04N 21/6334* (2013.01); *H04N 21/835* (2013.01); *H04L 63/126* (2013.01); *H04L 2209/603* (2013.01)

(58) Field of Classification Search
None
See application file for complete search history.

(56) References Cited

U.S. PATENT DOCUMENTS

| 5,001,752 A | 3/1991 | Fischer |
| 5,189,700 A | 2/1993 | Blandford |

(Continued)

FOREIGN PATENT DOCUMENTS

| DE | 102 33 959 A1 | 1/2004 |
| EP | 1 657 931 A2 | 5/2006 |

(Continued)

OTHER PUBLICATIONS

Alattar et al., "Improved Selective Encryption Techniques for Secure Transmission of MPEG Video Bit-Streams," International Conference on Image Processing, vol. 4, pp. 256-260 (1999).

(Continued)

*Primary Examiner* — Harunur Rashid
*Assistant Examiner* — Andrew Steinle
(74) *Attorney, Agent, or Firm* — Arnold & Porter LLP

(57) ABSTRACT

The systems, methods and apparatuses described herein permit encrypted media content to be displayed by an apparatus for a restricted time period. The apparatus may comprise a communication interface configured to couple to a controlling device to transmit a first nonce and to receive the encrypted media content and an association encryption envelope. The association encryption envelope may comprise at least a second nonce and a first time restriction expressed as a first time interval. The apparatus may further comprise a counter, a storage configured to store a value of the counter representing a time of when the first nonce is transmitted, and an engine configured to perform operations according to the first time restriction.

42 Claims, 9 Drawing Sheets

(51) Int. Cl.
*H04N 21/258* (2011.01)
*H04N 21/41* (2011.01)
*H04N 21/6334* (2011.01)
*H04N 21/835* (2011.01)
*H04L 9/08* (2006.01)
*H04L 9/32* (2006.01)

(56) References Cited

U.S. PATENT DOCUMENTS

| | | | |
|---|---|---|---|
| 5,500,897 A | 3/1996 | Hartman, Jr. | |
| 5,727,065 A | 3/1998 | Dillon | |
| 5,815,484 A | 9/1998 | Smith et al. | |
| 6,061,452 A | 5/2000 | Suzuki | |
| 6,157,719 A | 12/2000 | Wasilewski et al. | |
| 6,226,387 B1 | 5/2001 | Tewfik et al. | |
| 6,385,596 B1* | 5/2002 | Wiser et al. | 705/51 |
| 6,571,344 B1 | 5/2003 | Sitnik | |
| 6,785,401 B2 | 8/2004 | Walker et al. | |
| 6,996,248 B2 | 2/2006 | Fudge et al. | |
| 7,020,635 B2 | 3/2006 | Hamilton et al. | |
| 7,088,661 B2 | 8/2006 | Suzuki et al. | |
| 7,120,250 B2 | 10/2006 | Candelore | |
| 7,151,832 B1 | 12/2006 | Fetkovich et al. | |
| 7,213,005 B2 | 5/2007 | Mourad et | |
| 7,215,770 B2 | 5/2007 | Pedlow, Jr. et al. | |
| 7,286,667 B1 | 10/2007 | Ryal | |
| 7,292,691 B2 | 11/2007 | Candelore et al. | |
| 7,310,423 B2 | 12/2007 | Hobrock et al. | |
| 7,320,069 B1 | 1/2008 | Sundharraj et al. | |
| 7,336,787 B2 | 2/2008 | Unger et al. | |
| 7,343,495 B2 | 3/2008 | Kambayashi et al. | |
| 7,409,562 B2 | 8/2008 | Kahn et al. | |
| 7,480,314 B2 | 1/2009 | Kim | |
| 7,577,846 B2 | 8/2009 | Kudelski et al. | |
| 7,738,676 B1 | 6/2010 | Evans et al. | |
| 7,760,879 B2 | 7/2010 | Unger et al. | |
| 7,805,399 B2 | 9/2010 | Pinder et al. | |
| 7,853,531 B2 | 12/2010 | Lao et al. | |
| 7,853,800 B2 | 12/2010 | Watson et al. | |
| 7,929,483 B2 | 4/2011 | Kimball et al. | |
| 7,949,878 B2 | 5/2011 | Trinkel | |
| 8,069,116 B2 | 11/2011 | Gilliam et al. | |
| 2001/0046066 A1 | 11/2001 | Ueda et al. | |
| 2002/0026636 A1 | 2/2002 | LeComte | |
| 2002/0044658 A1 | 4/2002 | Wasilewski et al. | |
| 2002/0048367 A1 | 4/2002 | Maillard | |
| 2002/0051539 A1 | 5/2002 | Okimoto et al. | |
| 2002/0169970 A1 | 11/2002 | Candelore | |
| 2002/0170054 A1 | 11/2002 | Kudelski et al. | |
| 2002/0196939 A1 | 12/2002 | Unger et al. | |
| 2002/0198845 A1 | 12/2002 | Lao et al. | |
| 2003/0021205 A1 | 1/2003 | Suzuki et al. | |
| 2003/0026423 A1 | 2/2003 | Unger et al. | |
| 2003/0081776 A1 | 5/2003 | Candelore | |
| 2003/0097575 A1 | 5/2003 | Owada et al. | |
| 2003/0145329 A1 | 7/2003 | Candelore | |
| 2003/0196085 A1 | 10/2003 | Lampson et al. | |
| 2004/0006542 A1 | 1/2004 | Gilliam et al. | |
| 2004/0039704 A1 | 2/2004 | Gilliam et al. | |
| 2004/0095879 A1 | 5/2004 | Mons et al. | |
| 2004/0133908 A1 | 7/2004 | Smith et al. | |
| 2004/0168184 A1 | 8/2004 | Steenkamp et al. | |
| 2004/0237100 A1 | 11/2004 | Pinder et al. | |
| 2005/0005114 A1 | 1/2005 | Medvinsky | |
| 2005/0005286 A1 | 1/2005 | Koskela et al. | |
| 2005/0021989 A1 | 1/2005 | Johnson et al. | |
| 2005/0028192 A1 | 2/2005 | Hooper et al. | |
| 2005/0086666 A1 | 4/2005 | Nason et al. | |
| 2005/0195814 A1 | 9/2005 | Hagiwara et al. | |
| 2005/0226132 A1 | 10/2005 | Inokuchi et al. | |
| 2006/0023752 A1 | 2/2006 | Kim | |
| 2006/0050883 A1 | 3/2006 | Walker et al. | |
| 2006/0053077 A1 | 3/2006 | Mourad et al. | |
| 2006/0064759 A1 | 3/2006 | Agranat | |
| 2006/0095792 A1 | 5/2006 | Hurtado et al. | |
| 2006/0107285 A1 | 5/2006 | Medvinsky | |
| 2006/0146686 A1 | 7/2006 | Kim et al. | |
| 2006/0150211 A1 | 7/2006 | Ritter | |
| 2006/0174329 A1* | 8/2006 | Dublish | 726/4 |
| 2006/0248336 A1 | 11/2006 | Bruns et al. | |
| 2006/0259790 A1 | 11/2006 | Asokan et al. | |
| 2007/0086593 A1 | 4/2007 | Denning et al. | |
| 2007/0192789 A1 | 8/2007 | Medford | |
| 2007/0195667 A1 | 8/2007 | Ishida | |
| 2007/0294170 A1 | 12/2007 | Vantalon et al. | |
| 2008/0144821 A1 | 6/2008 | Armstrong | |
| 2008/0183623 A1* | 7/2008 | Xu et al. | 705/51 |
| 2009/0031431 A1 | 1/2009 | Boccon-Gibod | |
| 2009/0070582 A1* | 3/2009 | Aura et al. | 713/168 |
| 2009/0106847 A1* | 4/2009 | Krupman et al. | 726/26 |
| 2009/0132698 A1* | 5/2009 | Barnhill, Jr. | 709/224 |
| 2009/0158029 A1 | 6/2009 | Wheeler et al. | |
| 2010/0054698 A1 | 3/2010 | Isozaki et al. | |
| 2010/0058484 A1* | 3/2010 | Jogand-Coulomb et al. | 726/27 |
| 2010/0077215 A1 | 3/2010 | Placin | |
| 2010/0100729 A1* | 4/2010 | Read et al. | 713/156 |
| 2010/0131968 A1 | 5/2010 | Newell et al. | |
| 2010/0251282 A1* | 9/2010 | Howcroft | 725/25 |
| 2010/0278339 A1 | 11/2010 | Frenkel et al. | |
| 2010/0287585 A1 | 11/2010 | Frondal et al. | |
| 2010/0293570 A1 | 11/2010 | Teraoka et al. | |
| 2011/0010735 A1 | 1/2011 | Newell | |
| 2011/0093883 A1 | 4/2011 | Sun | |
| 2011/0107107 A1* | 5/2011 | Gantman et al. | 713/176 |
| 2011/0113443 A1 | 5/2011 | Yu et al. | |
| 2011/0129116 A1 | 6/2011 | Thorwirth | |
| 2011/0138410 A1 | 6/2011 | Sansom | |
| 2011/0191587 A1 | 8/2011 | Tian et al. | |
| 2012/0011567 A1 | 1/2012 | Cronk et al. | |
| 2012/0036365 A1* | 2/2012 | Kyslov et al. | 713/176 |
| 2012/0051541 A1 | 3/2012 | Wang et al. | |
| 2012/0158645 A1 | 6/2012 | Shafiee et al. | |
| 2012/0297413 A1* | 11/2012 | Choi et al. | 725/25 |
| 2013/0090129 A1* | 4/2013 | Turner et al. | 455/456.1 |

FOREIGN PATENT DOCUMENTS

| | | |
|---|---|---|
| JP | 08-147767 | 6/1996 |
| WO | WO 99/18506 A1 | 4/1999 |
| WO | WO 00/27067 A1 | 5/2000 |
| WO | WO 01/52020 A1 | 7/2001 |
| WO | WO 02/086725 A1 | 10/2002 |
| WO | WO 2005/081523 A1 | 9/2005 |
| WO | WO 2007/142816 A2 | 12/2007 |
| WO | WO 2009/015220 A2 | 1/2009 |
| WO | WO 2009/088919 A1 | 7/2009 |

OTHER PUBLICATIONS

Kwon et al., "Advanced A/V Encryption Technique for Digital Rights Management," International Symposium on Communications and Information Technologies, pp. 521-526 (2006).

Roy et al., "Secured Selective Encryption Algorithm for MPEG-2 Video," 3$^{rd}$ International Conference on Electronics Computer Technology (ICECT), pp. 420-423 (2011).

Servetti et al., "Frequency-Selective Partial Encryption of Compressed Audio," IEEE International Conference on Acoustics, Speech, and Signal Processing Proceedings, vol. 5, pp. 668-671 (2003).

Tosun et al., "Efficient Multi-Layer Coding and Encryption of MPEG Video Streams," International Conference on Multimedia and Expo, vol. 1, pp. 119-122 (2000).

Linnartz et al., "System Aspects of Copy Management for Digital Video," IEEE International Conference on Multimedia and Expo (2000).

Liu et al., "Secure Video Multicast Based on Partial Desynchronized Fingerprint and Partial Encryption," Digital Watermarking—Lecture Notes in Computer Science, 5041:335-349 (2008) herewith.

(56) References Cited

OTHER PUBLICATIONS

Pedroncelli et al., "Secure Multimedia Databases," Dissertation submitted in fulfilment of the requirements for the degree of Masters in Natural Science in Computer Science in the Faculty of Science at the Rand Afrikaans University, Sep. 2002.
Lee et al., "Temporal Feature Modulation for Video Watermarking," IEEE Transactions on Circuits and Systems for Video Technology, 19(4):603-608 (2009).
Sun et al, "A Secure and Robust Approach to Scalable Video Authentication," International Conference on Multimedia and Expo, 2:209-212 (2003).
Lian et al., "Secure Media Content Distribution Based on the Improved Set-Top Box in IPTV," IEEE Transactions on Consumer Electronics, 54(2):560-566 (2008).
Shigetomi et al., "An Anonymous Loan System Based on Group Signature Scheme," LNCS 2433, pp. 244-256 (2002).
Babatope, Intellectual Property Protection in the Age of Open Access and Digital Rights Management—Balancing the Odds, printed from the Internet on or about Jan. 12, 2012.
Holankar, "Streaming Media Security Using Digital Rights Management," A Thesis Presented to the Faculty of the Department of Computer Science, San Jose State University (2003).
Sornum, "Transport Delivery Methods and Security Implementation for D-Cinema-to-Home," Manuscript in Partial Fulfillment of the Assessment Requirements for DC6129: Directed Reading at Nanyang Technological University, (2007).
International Search Report for International Application No. PCT/IB2013/000361 dated Jun. 7, 2013.
Written Opinion for International Application No. PCT/IB2013/000361 dated Jun. 7, 2013.
International Search Report for International Application No. PCT/IB2013/000678 dated Jul. 23, 2013.
Written Opinion for International Application No. PCT/IB2013/000678 dated Jul. 23, 2013.
International Search Report for International Application No. PCT/IB2013/000331, dated Jun. 20, 2013.
Written Opinion for International Application No. PC1 IB2013/000331, dated Jun. 20, 2013.
Anonymous, Cryptographic Nonce, Wikipedia, The Free Encyclopedia, edited by FrescoBot, Feb. 2012.

\* cited by examiner

SYSTEMS, METHODS AND APPARATUSES FOR THE SECURE TRANSMISSION AND RESTRICTED USE OF MEDIA CONTENT

RELATED APPLICATIONS

This application claims priority to U.S. Provisional Application 61/605,692 filed Mar. 1, 2012, entitled "Systems, Methods and Apparatuses for the Secure Transmission and Restricted Use of Media Content," the content of which is incorporated by reference herein in its entirety.

FIELD OF THE DISCLOSURE

The systems, methods and apparatuses described herein relate to the improved protection of digital media content and the field of digital rights management.

BACKGROUND

The problem of media content misuse and digital rights management (DRM) is both well-known and significant. At the present time, there is no reliable way to provide both video and audio content to end-users while preventing them from making unauthorized, digital copies of the media. To make things worse, digital copies of the media can often be produced without any loss in quality. Furthermore, individuals who acquire a temporary license to use digital media content (i.e., "rent" digital media content) are often capable of circumventing any time restrictions placed on the content. One known weak point in the dissemination of media content from an internet store to a local device, such as a desktop computer, laptop or a smartphone, is the operating system of the local device. Both the operating system and/or the applications running under it, can be easily attacked by the end-user to circumvent any time or duplication restrictions.

What is needed are systems, methods and apparatuses for precluding software-based methods of evading usage restrictions, including time restrictions and content duplication limitations. While other methods of illicit use (e.g., hardware-based or server side software-based) may still exist (due to the very nature of content delivery), these attacks are much more technically complicated than software replication, and fewer numbers of individuals engage in these. Thus, precluding software-only attacks, which is the most widespread form of media content misuse, will severely limit numbers of the individuals capable of such misuse.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure comprises systems, methods and apparatuses for the secure transmission of media content from any type of media distribution outlet capable of electronically providing digital media content (e.g., an internet store, a television broadcast facility, a radio broadcast facility, etc.), to a local device (e.g., a smartphone, desktop computer, laptop, set-top box, etc.), running an operating system and possibly one or more applications, and then from the local device to a display device (e.g., a television set or monitor, etc.), for presentation on the device's screen. In another embodiment, media content may be transmitted directly from the media distribution outlet to a combined local device/display device for presentation on the screen. For example, a laptop might function both as the local device and the display device. Secure transmission of the media content from the media distribution outlet to the display device, whether via a local device or not, may be accomplished through a combination of symmetric and public-private key cryptography.

Figure 1:
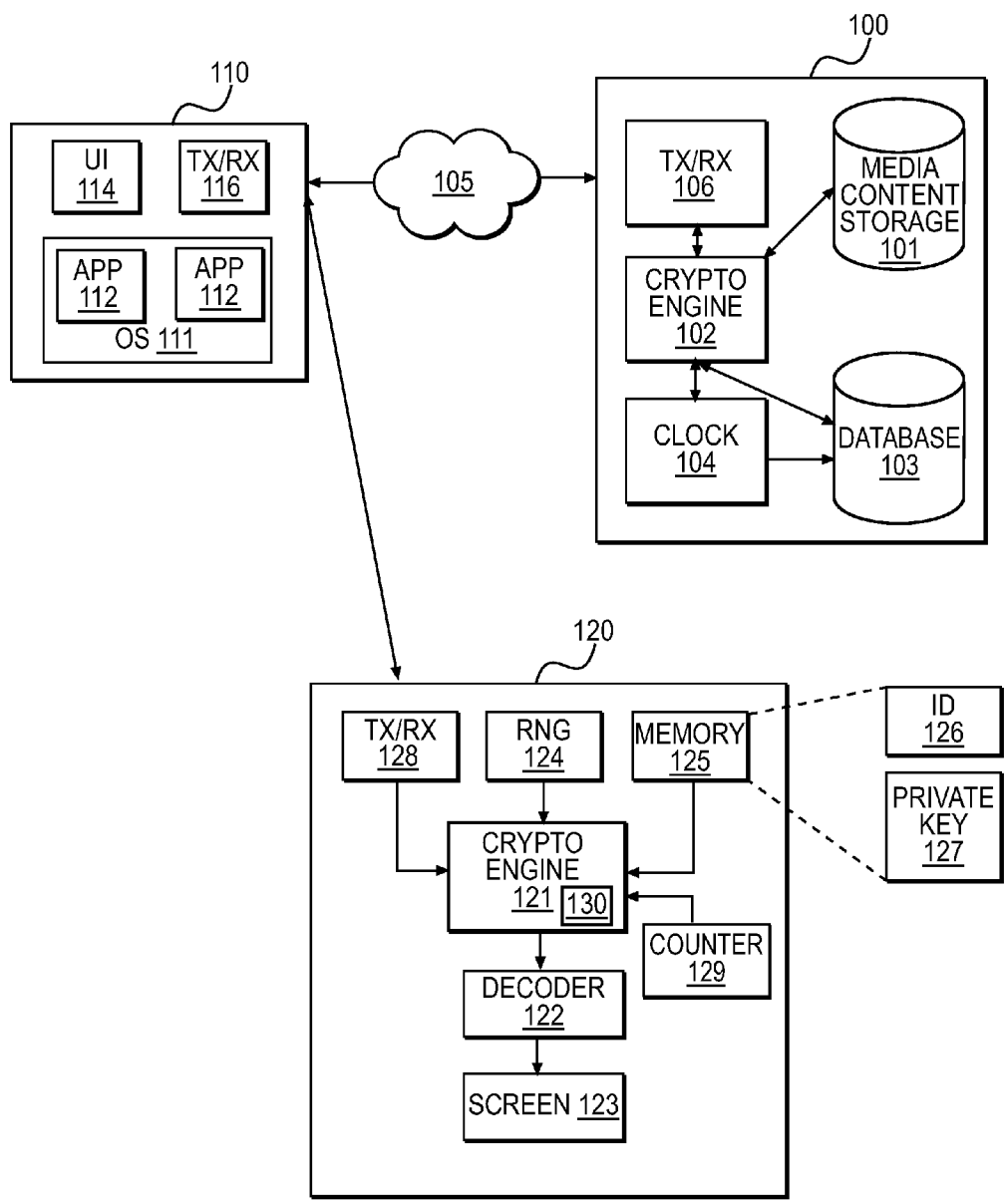
FIG. 1 is a block diagram of an exemplary system according to the present disclosure.

FIG. 1 shows a block diagram of an exemplary system according to the present disclosure. The system first comprises one or more display devices 120. Each display device 120 may possess a cryptography engine 121 capable of performing at least symmetric and asymmetric decryption. In certain embodiments, as described in further detail below, this crypto engine 121 may also be capable of performing symmetric and/or asymmetric encryption. For example, in one embodiment, the crypto engine 121 may implement RSA-2048 for public/private cryptography, and AES-256 for symmetric cryptography. Depending on the overall system needs, other ciphers alternatively may be used. As described in greater detail below, this functionality will allow the crypto engine 121 to a) decrypt a symmetric key previously encrypted with a public key associated with the device 120, and b) to decrypt media content data previously encrypted with the symmetric key. In embodiments providing encryption capabilities, the crypto engine 121 might also be able to, for example, digitally sign messages using a private key previously associated with the device 120. The keys used to support this encryption and decryption may be stored in a non-volatile memory 125, such as a non-volatile Flash memory. In one embodiment, the display device 120 may further comprise a hardware-based random number generator (RNG) 124 (such as, for example, a thermal-noise based or Zener noise-based generator) which can be used in support of the crypto engine 121.

Each display device 120 may further comprise a decoder 122 capable of decoding media content. "Media content" as used throughout refers to any visual data and/or audio data, such as, but not limited to, still images, pictures or graphics, text, movies, video clips, two-dimensional animation, web pages, video games, three-dimensional images or video (including three-dimensional animation), or any combination of the foregoing. As such, the decoder 122 may be configured to decode media content in a variety of formats such as PNG, JPEG, H.264 AVC, MPEG-2, and/or VC-1. In addition, the decoder 122 may support decoding of audio formats. Depending on the embodiment, the crypto engine 121 and the decoder 122 may be implemented as software running on a processor (not shown) of the display device 120. For example, if the display device 120 includes a Micro Controller Unit (MCU), the crypto engine 121 and decoder may be implemented as software running on the MCU. It will be understood, however, that these units may also be implemented in hardware, or in a hybrid software/hardware solution.

In some embodiments the display device 120 may include additional components and functionality. For example, in some embodiments the data signal from the decoder 122 may be forwarded to a video post processing unit (not shown), the purpose of which is to improve the overall video quality and/or adapt the signal according to the needs of specific implementation of screen 123 before it is transmitted to the screen 123 for display.

In some embodiments, the display device 120 may also comprise a counter 129, which may be used to determine the time elapsed between the occurrence of two events. As will be discussed in greater detail below, this may be used for supporting time restrictions on media content, such as, for example, a time-limited movie rental. By way of example only, a suitable counter 129 may take the form of an oscillator (including, but not limiting to a multivibrator) having a known frequency (in which the frequency may be optionally stabilized by using, for example, a quartz crystal resonator) and a digital counter, or any other type of apparatus capable of incrementing a count at a known frequency. To calculate the time elapsed between two events (e.g., the beginning and end of a movie rental period), the present state of the counter 129 can be recorded (e.g. in volatile memory 130 within crypto engine 121) at the first event and again at the second event. Then, in conjunction with the known frequency, the total number of increments occurring between the two events can be used to derive the actual elapsed time in seconds (or whatever other appropriate time measurement). By way of example only, a counter 129 operating at 60 ticks/minute could have value 60 at the time of a first event and 180 at the time of a second event. The difference between the first and second events, in ticks, is 120; thus, at 60/ticks per minute, it can be calculated that 2 minutes elapsed between the two events.

As shown on FIG. 1, the system may further comprise a local device 110 which may be, for example, a desktop computer, laptop, set-top box, etc. The local device 110 may comprise a user interface 114, an operating system 111, and one or more applications 112 (though it will be understood that there may be any number of applications or none at all) running under the operating system 111. In the discussion that follows, certain functionalities or capabilities of the local device 110 may be described as being performed by or encompassed within the operating system 111 or within an application program 112. It is to be understood that these exemplary embodiments are not intended to limit the scope of the present disclosure. Any functionality or capability of the local device may be performed by or embodied in any combination of the operating system 111, application program(s) 112, and/or specialized hardware.

Media content may be stored within the data storage 101 of a media distribution outlet 100, such as an Internet store, a television broadcast facility, a radio broadcast facility, a cable television headend, etc. One having ordinary skill in the art will understand that such a media distribution outlet 100 could be implemented, for example, using a group of servers connected to the Internet 105. In certain embodiments, the media distribution outlet 100 may further comprise a cryptography engine 102 capable of a) generating symmetric keys, b) performing symmetric encryption, and/or c) performing asymmetric encryption. This crypto engine 102 (either alone or in conjunction with other computer(s), server(s) and/or component(s) (not shown) comprising the media distribution outlet 100) may also be capable of creating partially encrypted media content containers. In certain embodiments, the crypto engine 102 may also be capable of performing decryption such as, for example, for the purpose of verifying a digital signature on a message received from another device. Like the crypto engine 121 of the display device 120, the crypto engine 102 of the media distribution outlet 100 may support any number of cryptographic algorithms, such as RSA-2048 and AES-256. As will be described in more detail below, the media distribution outlet 100 may further comprise a database 103 capable of storing information regarding users, the content they have already purchased, and the display devices 120 they use.

Each of the media distribution outlet 100, local device 110 and display device 120 may further comprise one or more communications ports 106, 116 and 128, respectively, by which each of these devices may transmit and/or receive media content, identifying information, and other information. The one or more communication ports 106, 116 and 128 may comprise any combination of hardware and/or software appropriate for establishing and maintaining two-way communications in an area (such as LAN, WAN or MAN), Internet, cellular, data, mobile or other appropriate network using any combination of wired (e.g., serial, parallel, Ethernet, and/or USB) and/or wireless (e.g., BLUETOOTH, near field communications, infrared, various flavors of IEEE 802.11, GSM, CDMA) technology, and/or custom connectors/protocols. It is to be understood, however, that these references are merely exemplary, and the invention is not limited to any specific form of communications technology.

To strengthen security throughout the entire process, in one embodiment, the display device 120 itself should have no capability to release unencrypted content in any form (except for showing the content on its screen). For example, allowing a television set to have unencrypted HDMI output from an encrypted stream may weaken the security of the systems and methods provided herein. It should be recognized, however, that in some implementations such an unencrypted output may be included in the display device for business considerations rather than technical or security considerations.

Figure 2:
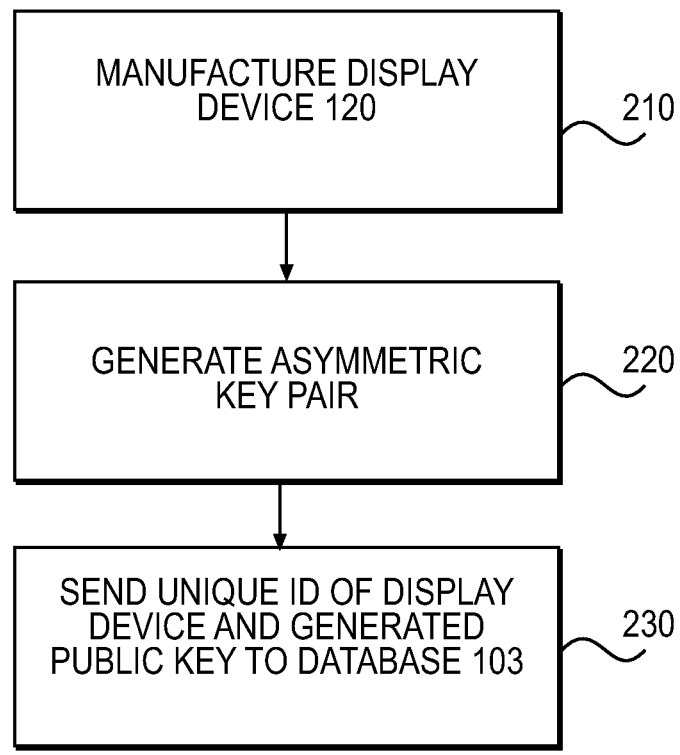
FIGS. 2-4 are flow diagrams of exemplary methods of preparing and transmitting media content according to the present disclosure.

FIG. 2 shows an exemplary manufacturing process for a display device 120. At step 210, a display device 120 may be manufactured and a unique ID 126 (e.g., a serial number) may be assigned to and stored within the device 120. At step 220, a public/private key pair may be generated and assigned to the device 120 using, for example, the RNG 124. The private key 127 may be stored within the non-volatile memory 125 on the device 120, such that it cannot be extracted from the device 120 or otherwise compromised (for example, the memory 125 may be tamper-resistant or, at the very least, tamper-evident). The public key, on the other hand, may be retrieved from, or transmitted externally by, the display device 120. In other embodiments, the public/private key pair can be generated externally, and the private key 127 can be transferred into the display device 120. Regardless of how the key pair is generated, to enhance security, the display device 120 should not be capable of transmitting or otherwise revealing the private key 127.

At step 230, the device's unique ID 126 and public key may be provided to the media distribution outlet 100 for future use. For example, the manufacturer of the display device 120 may periodically send the unique ID and public key information of the devices it manufactures to the media distribution outlet 100. It may be desirable to restrict access to the manufacturing facility, so as to ensure that only "good" public keys (i.e., keys from actually-manufactured display devices, not just fake key sets generated maliciously) are delivered to the media distribution outlet 100.

In one embodiment, device IDs and public keys may be stored in the database 103 of a media distribution outlet 100 for future use. However, it will be understood that there may be numerous distribution outlets capable of interacting with local devices 110 and display devices 120. Therefore, the display device 120 manufacturer may send this information to all or a subset of known outlets 100, or, for example, to a centralized database which may be accessible by all or a subset of known distribution outlets 100.

In another embodiment, the crypto engine 102 and/or the database 103 may be physically and/or logically separated from the media distribution outlet 100 and its associated media content stored in media content storage 101. For example, a centralized entity may possess device IDs and public keys, such that individual media distribution outlets 100 may contact this entity to obtain access to device IDs and public keys. In this manner, media content sellers/distributors themselves would not need to possess the information (and update it as new devices are manufactured), but could simply access the centralized entity. In some embodiments this entity could also be responsible for performing some or all of the necessary encryption and could then pass encrypted data back to the media distribution outlet 100 for further use and transmission.

Figure 3:
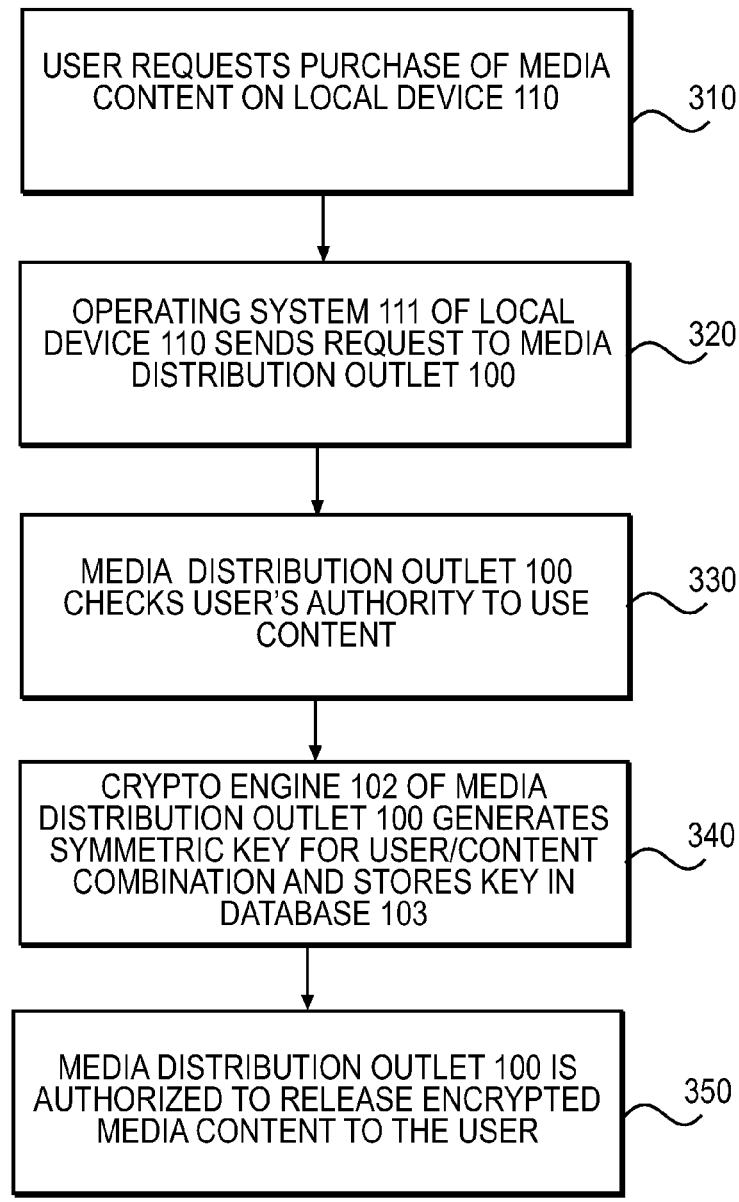

FIG. 3 shows an exemplary method by which a user may acquire rights to media content using a local device 110. At step 310, a user may request the purchase or rental of media content via the user interface 114. (This request may be explicit, or may implicitly result from a user request to download or playback media content.) The request may be generated within the operating system 111 or an application 112, and may include a unique user ID and a content ID. In certain embodiments the user ID may refer to a specific individual; in other embodiments, the user ID might refer simply to the local device 110 sending the request. The request may further include an indicator as to whether the user wishes to "rent" the content for a limited period of time (e.g., two hours, twenty-four hours, two days, one month, etc.) or to "purchase" the content, i.e., to acquire a non-time-limited license to view (or otherwise use) the content.

At step 320, the operating system 111 may send the request, via the communications port 116, to the communications port 106 of the media distribution outlet 100. In certain embodiments, all communications with media distribution outlet 100 may require user authentication (for example, by using a user ID/password combination), to be followed by use of an encrypted channel.

The media distribution outlet 100 may, at step 330, review the request and determine that the user is a registered user of the outlet 100 and that the user is authorized to view the content. For example, the outlet 100 may verify that the user has paid for the content (e.g., by using a credit card or by using an existing balance on the user account), or that the user is otherwise authorized to view the content (e.g., by presenting a promotional code or for some other reason). The outlet could also verify that the user has appropriate privileges to view the content, e.g., parental control privileges. It will be understood that in embodiments in which only the local device 110 is identified by the user ID (as opposed to the actual user) that the outlet 100 will only be able to verify payments, privileges and other information with relation to the local device 110, not the specific user. Therefore, in embodiments in which identifying the specific user is important (e.g., in a parental-control application), it may be desirable to authenticate individuals rather than just devices.

The outlet could further verify that the time duration the user has requested for viewing privileges is appropriate. For example, some content may not be available for purchase, but may only be rented for a definite time period (e.g., two days). A user request to purchase such content may be rejected by the media distribution outlet 100, or may be treated by the media distribution outlet 100 as a request to rent the content for the maximum time permitted by the outlet 100.

At step 340, the crypto engine 102 of the media distribution outlet 100 may generate one or more cryptographically-safe symmetric keys which may be stored in database 103 and associated with this user, and this media content. The media distribution outlet 100 may also store in the database 103 any time-duration restrictions associated with the user's acquisition of the content. In such embodiments, the media distribution outlet 100 may include a secure clock 104, capable of providing accurate real-world time and for executing related calculations and/or logic. To increase its reliability and precision such a clock may optionally be (1) periodically synchronized with a GPS signal obtained from a GPS antenna (not shown), (2) implemented based on a built-in high-precision clock, like an atomic clock, and/or (3) periodically synchronized with a high-precision clock (such as the U.S. Naval Observatory Master Clock). Real-world times may be used within the media distribution outlet 100; each display device 120 can have its own form of counter 129 and may be responsible for translating time restrictions received from the media distribution outlet 100 (which may arrive in any appropriate format, such as a number of seconds, or a number of minutes, or a number of hours, etc.) into its own appropriate number of counts by the counter 129. The information the media distribution outlet 100 stores in the database 103 may vary depending on the specific embodiment, and any suitable method of establishing a time restriction may be used. It will be understood that the examples which follow are merely exemplary.

In one embodiment, the media distribution outlet 100 might store a real world "start time" in database 103 after which the user may start playing back the content acquired at step 310, e.g., Feb. 22, 2012 at 13:24 UTC. (UTC refers to Coordinated Universal Time; it will be understood, however, that the use of UTC is merely exemplary and other time zones may also be used.) The media distribution outlet 100 might also store a duration associated with the content, e.g., one week, or 604,800 seconds. If database 103 is a relational database, this information could be stored, for example, as (user ID, content ID, start time, duration, symmetric key) rows.

In another embodiment, the media distribution outlet 100 might store in database 103 the (real-world) start time and a real-world "end time" at which the content expires. With respect to the foregoing example, those times might be stored as a start time of Feb. 22, 2012 at 13:24 UTC and an end time of Feb. 29, 2012 at 13:24 UTC. Assuming again that database 103 is a relational database, this information could be stored, for example, as (user ID, content ID, start time, end time, symmetric key) rows.

In some cases, the start time may be considered optional. For example, certain content might be available immediately from the time of acquisition. Then, by the time the content is released to the user after acquisition, the start time will already have passed and only the end time will affect the user's playback rights. To indicate that the start time is not used (or is already in the past) a special flag could be set, or a special value (for example, Jan. 1, 1601 at 00:00 UTC) could be saved instead of a specific start time.

At step 350, the media distribution outlet 100 may be permitted to release the media content to the user via its communications port 106, provided that the content has been encrypted with the symmetric key(s) which can be found in database 103 as associated with this user and this content. For example, the user might be allowed to download the encrypted media content to his local device 110. If multiple symmetric keys have been used to encrypt the content, all of those symmetric keys (and to the extent necessary, any information describing which keys apply to which portion of the content) can be stored in database 103. It will be noted that it is not a requirement of the system that a new key be generated for each user/content combination. However, the reuse of keys for different users and/or different content requested by the same user may reduce the overall system security (for example, by opening additional possibilities for differential cryptanalysis). Thus, it may be preferable to generate a new, unique key for each user/content combination.

In order to decrypt media content released, e.g., as according to step 350, the user must have some way of acquiring the symmetric key or keys used to encrypt the content. One method according to the present disclosure solves this problem by requiring the user to associate his purchased content with a specific display device 120. Once the content is associated with a specific display device 120, the symmetric key can be securely transferred to that display device 120 using the exemplary methods described herein.

Figure 4:
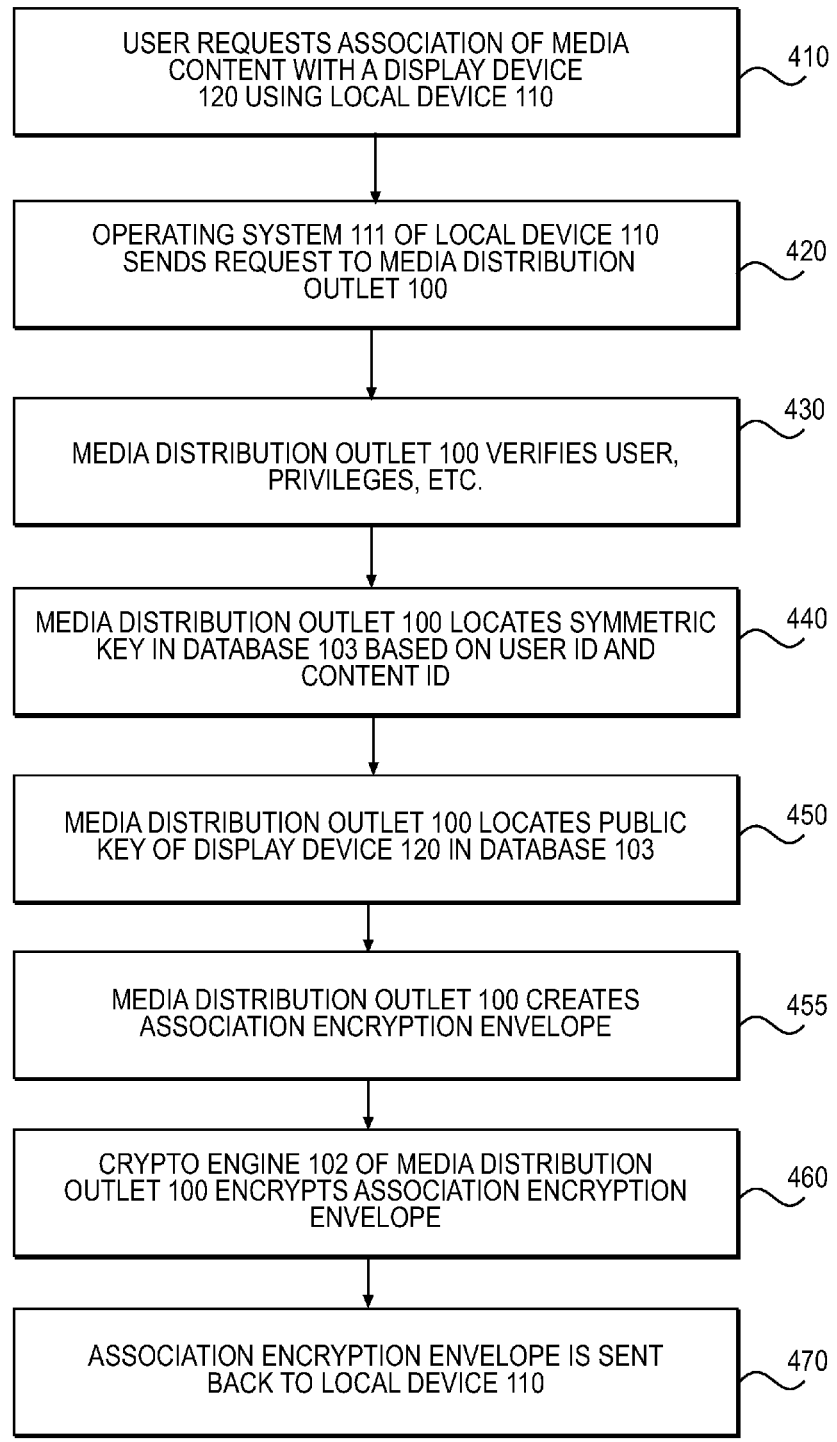

FIG. 4 shows one such method of associating purchased content with a specific display device 120. At step 410, the user may interact with his local device 110 (via the user interface 114) to request the association of purchased content with a specific display device 120. (This content may already have been downloaded to the local device 110, may be in the process of downloading to the local device 110, or may require downloading to the local device 110.) The local device 110 may already possess in its memory the unique ID 126 of the display device 120 which is to be associated with the purchased content, or it may communicate via its communication port 116 with the display device 120 in order to receive the display device's unique ID 126.

At step 420, the operating system 111 may send an association request, comprising the unique ID 126 of the display device 120, the content ID and the user ID, from its communications port 116 to the communications port 106 of the media distribution outlet 100. In embodiments configured to implement time limitations, the display device 120 may store the current value of the counter 129 within the volatile memory 130 of crypto engine 121 as an attribute of the current association request.

In certain embodiments, the association request may include an "expiration time." For example, it will be understood that, if media content is time-limited, it should not be available for playback after the end time. Thus, the expiration time contained in the association request might be the same as the end time, indicating that the association should expire at the end time of the media rental. For example, an individual may rent a movie for a five-day period. He may then associate the movie with his television set for the duration of the rental, which will allow him to watch the movie on his TV set at any time during the five-day period.

In some cases, however, it might be desirable to set a shorter expiration time. For example, one night of the five-day rental period, the user may be at a friend's house. In this case, the user may wish to associate the movie with his friend's television, but only for the three-hour period during which he will be at his friend's house. This "temporary" association would then automatically expire at the end of the three-hour period, such that the friend cannot continue to watch the content on his television.

In some embodiments, regardless of the expiration time indicated in the association request, a user may have the option of explicitly disassociating a particular content and a particular device after they have been associated as discussed herein. Such explicit disassociation may include, for example, the display device 120 removing from its crypto engine 121 the stored symmetric key for the content in question, and signing the confirmation that disassociation for certain content ID has been performed with one of its own private keys. When such confirmation arrives at the media distribution outlet 100, the media distribution outlet 100 may assume that display device 120 is no longer associated with the content in question.

In certain embodiments, it may be desirable to digitally sign the association request with the private key 127 of the display device 120 in order to authenticate the display device 120 which is requesting the association. In such a case, the local device 110 may send the association request to the display device 120. The display device 120 may use its crypto engine 121 to sign the association request (e.g., encrypt the association request) with a private key (which may be private key 127 or a different private key), and then may transmit the signed request back to the local device 110 via its communications port 128. This may allow the crypto engine 102 of the receiving media distribution outlet 100 to use a public key of the display device 120 to verify that the association request was generated by that particular display device 120. It will be understood that, to promote the integrity of these key pairs, that the key pair used for signing the association request may be a different key pair than is used for encryption of the user/content symmetric keys.

In embodiments which provide for time-limited associations or allow explicit disassociation, it may further be desirable to include a nonce, i.e., a cryptographically-safe random number, within the signed association request. Thus, the local device 110 may send an association request to the display device 120. The display device 120 may generate a nonce, using, for example, RNG 124, and attach it to the association request. The display device 120 may save this nonce, in conjunction with the current value of the counter 129, within the volatile memory 130 of the crypto engine 121 as an additional attribute of the current association request. Use of the nonce and the stored counter 129 state, as described further herein, may protect against "replay attacks," in which a user may try to use the same association request repeatedly in violation of his license rights to the media content.

In addition, to mitigate some attacks from compromised operating systems (e.g., distributed denial of service attacks), it may be desirable to restrict the rate of signing these association requests (within the display device 120) to a limited number for a predetermined amount of time. By way of example, and not limitation, the signing of association requests may be limited to 1 request per 5 seconds.

At step 430, the media distribution outlet 100 may receive the association request (generated at, e.g., step 420) and may check a) that the user is authorized to view the requested content (by, for example, detecting the presence of a symmetric key within database 103 for that specific user ID/content ID combination), b) that an allowed number of associated display devices 120 has not been exceeded for this user ID/content ID, and/or c) that the display device 120 has been registered in database 103 (and hence has an associated public key). If the association request has been signed by the display device 120, the media distribution outlet 100 also may verify the signature on the request (e.g., by decrypting the request) by using the device's public key. After the checks are performed the media distribution outlet 100 may add a new record in database 103 to indicate that the display device 120 has been associated with this user and content.

At step 440, the media distribution outlet 100 may locate the symmetric key for the specific user/content combination within database 103, and at step 450 it may locate the public key of the display device 120 within database 103.

At step 455, the media distribution outlet 100 may create an "association encryption envelope," which may be used to relay information to the display device 120 such that the display device can ultimately playback the content for the user. For example, in certain embodiments the association encryption envelope may contain the symmetric key found in step 440, which can be used to decrypt the media content for playback on the device 120.

In some embodiments, the association encryption envelope may further comprise time duration restrictions. These restrictions, unlike the restrictions stored in database 103 of the media distribution outlet 100, may be expressed as intervals of time, rather than real-world times. For example, if the present time is Feb. 22, 2012 17:30 UTC, then rather than indicating that a movie rental expires at 23:59 UTC on Feb. 29, 2012, the association encryption envelope might indicate that the rental expires 10,410 minutes (i.e., one week, 6 hours and 29 minutes) from the moment that the display device 120 receives the association encryption envelope.

As will be described in further detail below, before calculating these intervals of time, in some embodiments the media distribution outlet 100 may determine whether an association encryption envelope had previously been created for this media content/user/display device 120 combination. The media distribution outlet 100 may determine this by, for example, checking to see whether a start and/or end time had previously been stored within database 103.

In addition, because Internet services can be accessed from almost anywhere in the world, it might be desirable, in some embodiments, to add additional logic within clock 104 to handle issues related to time zones. For example, if the clock 104 provides a time for the UTC time zone, and a user is from New York, where Eastern Time (ET) is in effect, then, it may be desirable to perform certain additional calculations to account for the user's reasonable expectation that time limitations will be with respect to the user's local time zone. By way of example, if the current time provided by clock 104 is Feb. 22, 2012 at 17:30 UTC, and the user from in the Eastern time zone wants to rent some content until the end of Feb. 29, 2012, that is, until Feb. 29, 2012 at 23:59 ET, then the association encryption envelope might indicate that the rental expires in 10,710 minutes because Feb. 29, 2012 at 23:59 ET corresponds to Mar. 1, 2012 at 04:59 UTC, which will happen 7 days, 11 hours and 29 minutes from the time the user made his request (Feb. 22, 2012 at 17:30 UTC). Additionally, the algorithm used to perform the special handling related to time zones may also take into account whether jurisdictions within the time zone adhere to daylight savings time.

It will be understood, of course, that these intervals may be expressed in seconds, minutes, hours, days or any other appropriate time period. For example, if at, e.g., step 310, the user requested to rent a movie for one week, but wished to delay the rental for one day, the association encryption envelope may contain a start time of 86,400 seconds (i.e., one day) and an end time of 691,200 seconds (i.e., seven days' rental+start time of 86,400).

The association encryption envelope described above may further comprise the nonce that was transmitted to the media distribution outlet 100 as part of the association request. This will tie the association encryption envelope to the corresponding association request, such that it is possible for display device 120 to determine with specificity which association request resulted in this particular association encryption envelope.

Once the association encryption envelope has been created, at step 460, the crypto engine 102 may encrypt the association encryption envelope with the public key of the display device 120, and at step 470 the display device 120 may send the association encryption envelope back to the operating system 111 of the local device 110.

It will, of course, be understood that in some embodiments the processes of purchase and association can be initiated by a single action of the user (for example, "purchase and play" action or an equivalent). In this case, the operating system 111 can initiate the processes of acquiring rights to content (e.g., FIG. 3) and association (e.g., FIG. 4) automatically, one immediately after the other, without user intervention. In some cases, such requests can be even combined together to avoid unnecessary round-trip times.

Figure 5A:
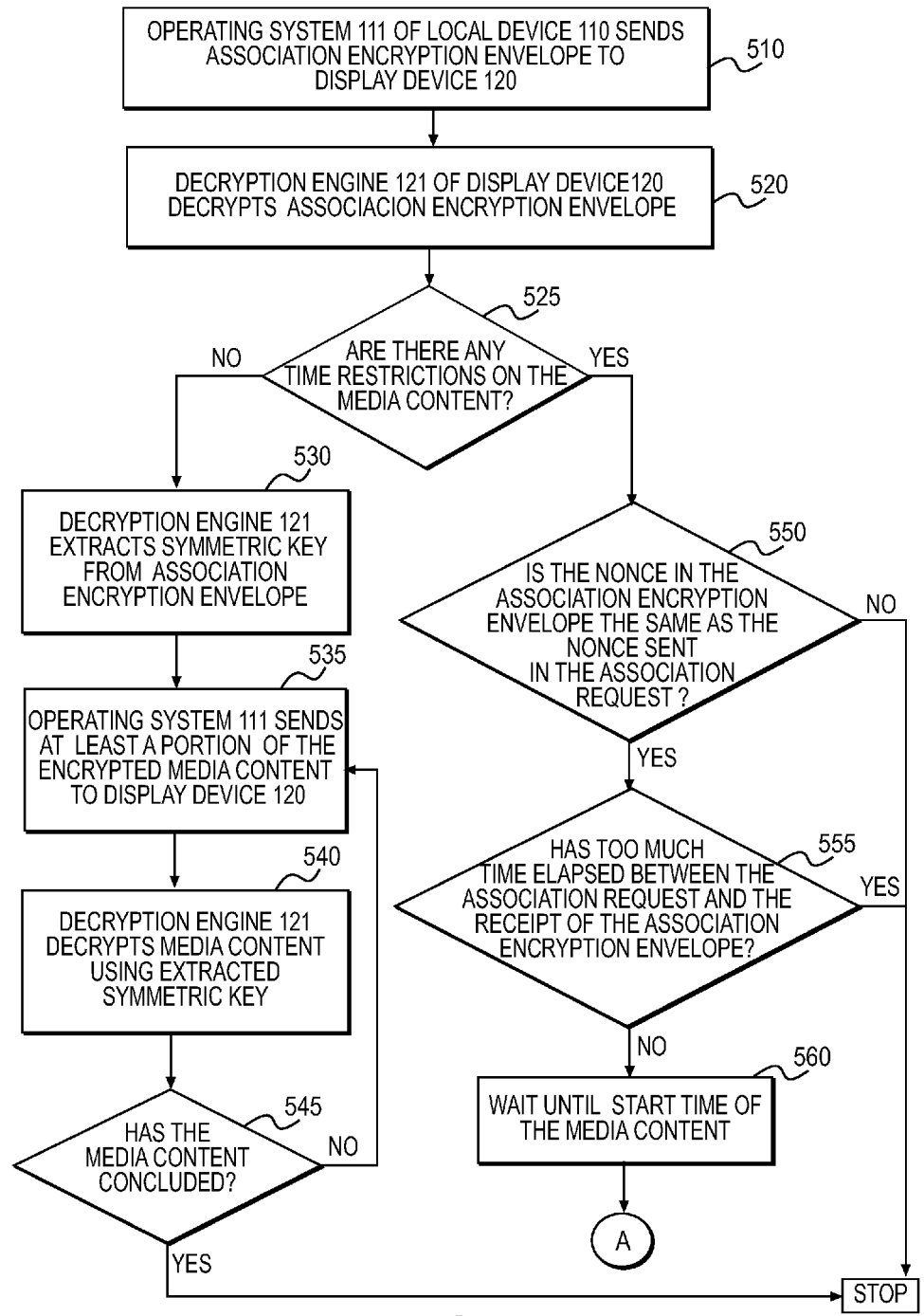
FIGS. 5a and 5b are a flow diagram of an exemplary method by the local device and display device for processing media content.
Figure 5B:
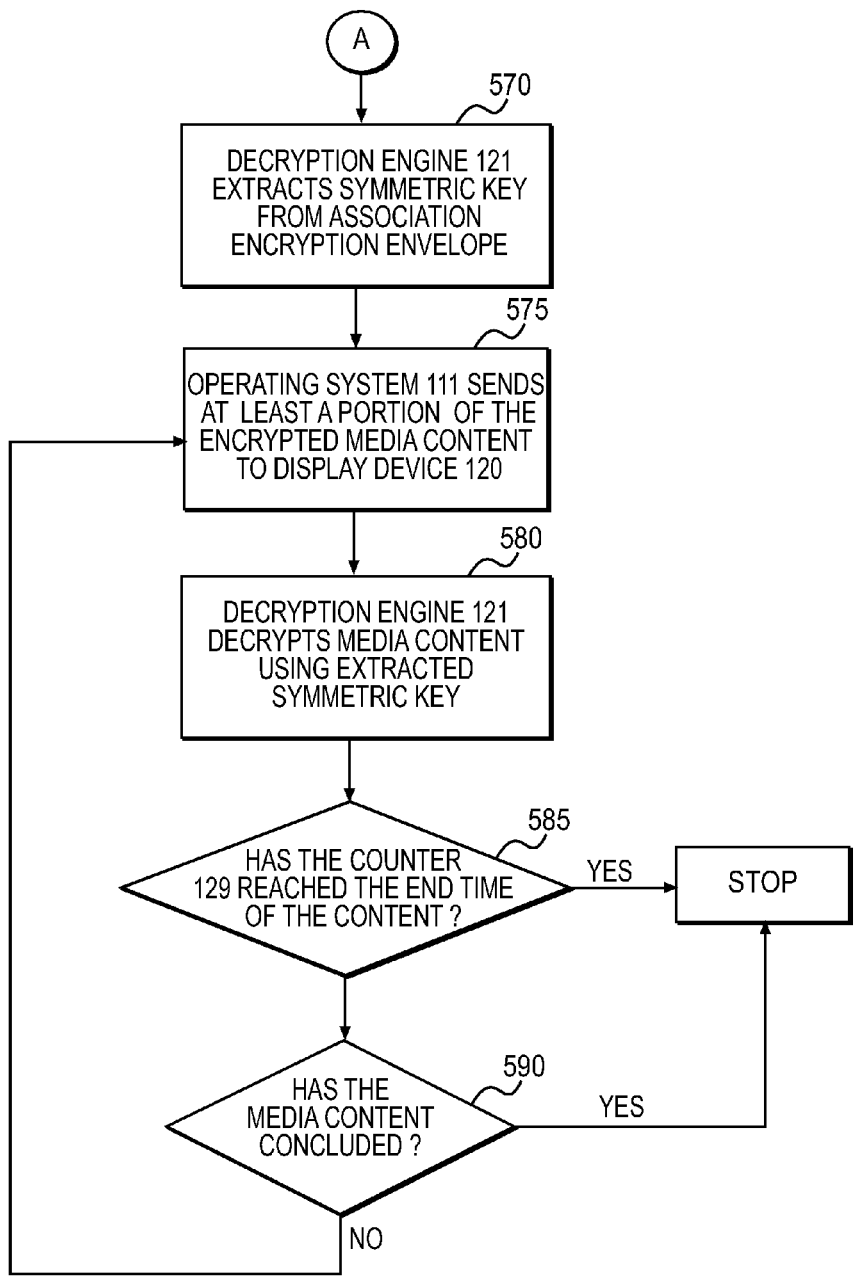

FIGS. 5a and 5b show an exemplary process for the playback of content acquired by a user (e.g., in accordance with the acquisition process described with respect to FIG. 3), on a display device 120 which previously has been associated with the user and the content (e.g., in accordance with the association process described with respect to FIG. 4). Thus, it is assumed for the purpose of describing FIGS. 5a and 5b that, before playback, the local device 110 has already received an association encryption envelope (encrypted using the public key corresponding to private key 127), and that this association encryption envelope contains at least a symmetric key which can be used to decrypt the acquired content.

As shown on FIG. 5a, at step 510, the operating system 111 may send the received association encryption envelope (still encrypted by the public key of the display device 120) to the display device 120. For the purpose of this exemplary method, it is assumed that the association encryption envelope and the encrypted media content are separate data structures capable of being transmitted and/or processed separately.

As shown on FIG. 5a, at step 520, the crypto engine 121 of the display device 120 may decrypt the association encryption envelope using the device's private key 127 and may process any information contained within the envelope.

For example, at step 525, the display device 120 may determine whether there are any time restrictions on the content contained within the association encryption envelope. If there are no such time restrictions, then at step 530 the display device 120 may extract the unencrypted symmetric key from the decrypted association encryption envelope. At step 535, operating system 111 may begin transmitting at least a portion of the purchased content (such content still in an encrypted form, encrypted using the user/content-specific symmetric key) to the display device 120. As the display device 120 receives encrypted content, at step 540 its crypto engine 121 may decrypt the content using the user/content symmetric key obtained at step 520. Then, the decrypted content may be decoded by decoder 122 and shown on screen 123. If, at step 545, there is still media content remaining (e.g., the entire movie has not been transmitted to the device 120), the method may return to step 535 to continue transmitting, decrypting and displaying content. If not, the method may stop.

If, however, at step 525, there are time restrictions on the content contained within the association encryption envelope, the method may proceed to step 550. Before executing any time restrictions, in certain embodiments, it may be desirable to determine that the received association encryption envelope is valid and that the system has not been subject to a replay attack. Thus, at step 550, the crypto engine 121 may compare the nonce within the association encryption envelope to the nonce stored in the volatile memory 130 of the crypto engine 121 when the association request was made, e.g., at step 310. If the values do not match, it may be assumed that the received association encryption envelope is not a reply to the request sent, e.g., at step 310, is therefore invalid, and should be discarded. For example, the received association encryption envelope could be a replayed reply to a previous request.

At step 555, the method may implement an additional mechanism for detecting replay attacks by calculating the time between the association request and receipt of the association encryption envelope. If the time between the request and the reply is substantial—for instance, greater than 5 minutes—then the reply could be discarded as a potential replay attack. In some embodiments, this time interval may be calculated using the counter 129 on the display device 120. For example, at step 310, when the association request was made, the then-current value of the counter 129 may have been stored in the volatile memory 130 of the crypto engine 121. Then, at this step 555, the current value of the counter 129 may again be determined. As described previously, using the known frequency of the counter 129 and the difference in increments between the request and the reply, it is possible to calculate the elapsed time between the two events.

At step 560, the display device 120 may verify that the start time included within the association encryption envelope has passed, or wait until the start time is reached. The display device 120 may interpret these time restrictions in terms of increments. For example, returning to one of the movie rental scenarios described previously, the association encryption envelope might indicate that the user is authorized to begin watching the movie 86,400 seconds (i.e., one day) from the moment that the association encryption envelope is received on the display device 120. To translate this time into intervals with which the counter 129 can work, the display device 120 may first note its state at the moment the association encryption envelope is received. For example, the counter might have value 1000 when the association encryption envelope is received. Then, the display device 120 might convert the received start time into an increment value, and then deny playback if the current value of the counter 129 is not within the restriction. If the counter 129 is known to operate at, for example, 60 ticks/minute, then the display device 120 may wait (i.e., not permitting playback of the movie) at step 560 until the counter 129 reaches 87,400 (60 ticks/minute is 1 tick/second; 86,400 seconds=86,400 ticks; the resulting count=86,400+1000).

Once the start time has been reached (or if it has already been passed), as shown on FIG. 5*b*, at step 570 the display device 120 may extract the unencrypted symmetric key from the decrypted association encryption envelope. At step 575, the local device 110 may transmit at least a portion of the encrypted media content to the display device 120. As the display device 120 receives encrypted content, at step 580 its crypto engine 121 may decrypt the content using the user/content symmetric key previously obtained, e.g., at step 520. Then, the decrypted content may be decoded by decoder 122 and shown on screen 123.

At step 585, the method may determine whether the end time of the content has been exceeded, i.e., whether the user has reached the end of his rental period. For example, the association encryption envelope for the seven-day movie rental may have contained an end time of 11,520 minutes (corresponding to seven days, plus the start time of one day). As at step 560, the display device 120 may convert this number into an increment value for comparison to the current state of the counter 129. If the counter 129 value has not yet exceeded the calculated end time, the method may proceed to step 590 and determine whether the media content itself has completed, e.g., whether the movie has finished. If, at step 590, the media content has not finished steps 575 through 590 may be repeated as necessary. If, at steps 585 or 590, the end time has been reached or the media content has finished, respectively, the method may stop performing any decryption and may cease to provide content to the user.

In one embodiment, the media distribution outlet 100 may not place a limit on the number of display devices 120 with which a user may associate a media content but prevent the user from associating the media content with more than one display device 120 simultaneously. For example, a user may request a renewable time-limited license for certain media content, e.g., at step 310, and the media distribution outlet 100 may grant to the user the right to associate that content with one display device 120 at any given time, e.g., at step 330. This type of license grant may allow the user to move the purchased content freely between display devices 120, provided that content is not simultaneously associated with more than one display device 120.

In such an embodiment, each time the user attempts to associate the media content with a display device 120, the media distribution outlet 100 may first verify that the content is not already associated with another display device 120. If the content is not already associated with another display device, the media distribution outlet 100 may issue a time-limited association encryption envelope, e.g., in accordance with the method described with respect to FIG. 4, where the time-limited association encryption envelope may also include an additional flag or indication that the license is renewable. For example, the time-limited association encryption envelope may be for a period of two hours.

When the user attempts to play back the media content, the display device 120 may decrypt the association encryption envelope, extract the symmetric key, and decrypt, decode and play back the media content, e.g., as described with respect to FIG. 5. In this embodiment, however, the method may perform an additional step of noting that a "renew" flag has been provided in the association encryption envelope and, in the event that the content is mid-playback, at some predetermined time before the association is set to expire (for example, 10 minutes before the end of time-limited association), the display device 120 may automatically request an additional time-limited association. This additional association can be issued for another time-limited duration (e.g., 2 hours), and the process can be continued in this manner until the user expressly stops playing back the content or the content otherwise finishes.

In such an embodiment, whether the media distribution outlet 100 permits a new time-limited association of the media content with a second display device 120 may depend on what occurred with respect to the previous time-limited association with the first display device. For example, if the user expressly stops playing back media content, then the display device 120 or local device 110 may send an express request to the media distribution outlet to disassociate the media content and the display device. Thereafter, the user may immediately associate the media content with a new display device.

If, on the other hand, the media content stops playing in an irregular manner (for example, the display device 120 was damaged or destroyed and never sent an explicit disassociation request to the media distribution outlet 100), then the media distribution outlet may not permit the user to associate the content with a new device until the previous time-limited association expires (e.g., the two-hour period of association passes). However, to mitigate situations in which an express disassociation did not occur through no fault of the user (e.g., the TV is damaged), and to avoid the user having to wait until the old time-limited association encryption envelope expires, in some embodiments the media distribution outlet may allow a second time-limited association encryption envelope with respect to a new display device even though the old association encryption envelope has not yet expired. So as to prevent abuse, however, the number of these simultaneous or overlapping time-limited associations should be limited.

The foregoing description with respect to FIGS. 5a and 5b has assumed that the counter 129 is fully operational at all times. For example, in certain embodiments, the display device 120 may include a backup battery or other form of power supply (not shown on FIG. 1) which may be used to continue to power the counter 129 even when the device 120 has been turned "off." However, in certain embodiments, this assumption may not be true. For example, the counter 129 may not have a backup power supply, such that it will not count if power is cut to the display device 120. In such a case, the display device 120 may not accurately enforce timing restrictions.

The foregoing description with respect to FIGS. 5a and 5b has also assumed that the counter 129 functions consistently at the known frequency. However, timing devices, such as the counter 129, may be subject to drift. This drift can work both ways, such that, over time, counter increments take more or less actual time than they had when the counter 129 was originally started. This can obviously reduce the precision of timing devices, and as the time intervals to be calculated increase in length, any errors introduced by drift are likely to increase in magnitude. As in cases when the counter 129 is powered down, counter drift may prevent the display device 120 from accurately enforcing a timing restriction.

To account for these possibilities, in one embodiment, the display device 120 might, from time to time, send one or more new association requests to media distribution outlet 100 in order to obtain new start and end times. In this type of "forced association," the media distribution outlet 100 may create a new association encryption envelope just as it created the initial association encryption envelope, e.g., as described with respect to FIG. 4. However, because some time will have elapsed since the creation of the initial association encryption envelope, the end time interval placed in the new envelope will be shorter. For example, if the initial association encryption envelope was created on Feb. 29, 2012 at 12:00 UTC, and the original start and end times stored in database 103 were Mar. 1, 2012 at 00:00 UTC and Mar. 7, 2012 at 23:59 UTC, respectively, the initial association encryption envelope may have contained start and end times of 12 hours and 180 hours, respectively. If a forced association were requested three days later, at Mar. 3, 2012 at 12:00 UTC, the new association encryption envelope could contain start and end times of 0 hours and 108 hours, respectively.

These forced associations could occur automatically the next time the device 120 is powered on, may occur as needed (e.g., if the user requests playback of media content and the device 120 needs to determine if it is within a time restriction), or may occur at the express command of the user. In some embodiments, and as described in more detail later, these forced associations may also occur to ensure that the display device 120 is operating within a predefined margin of error with respect to a particular media content. As described in more detail below, in some embodiments the media distribution outlet 100 may transmit this predefined range of error within each association encryption envelope, such that the display device 120 can monitor errors and automatically request a forced association when the predefined error range would otherwise be exceeded.

Figure 6:
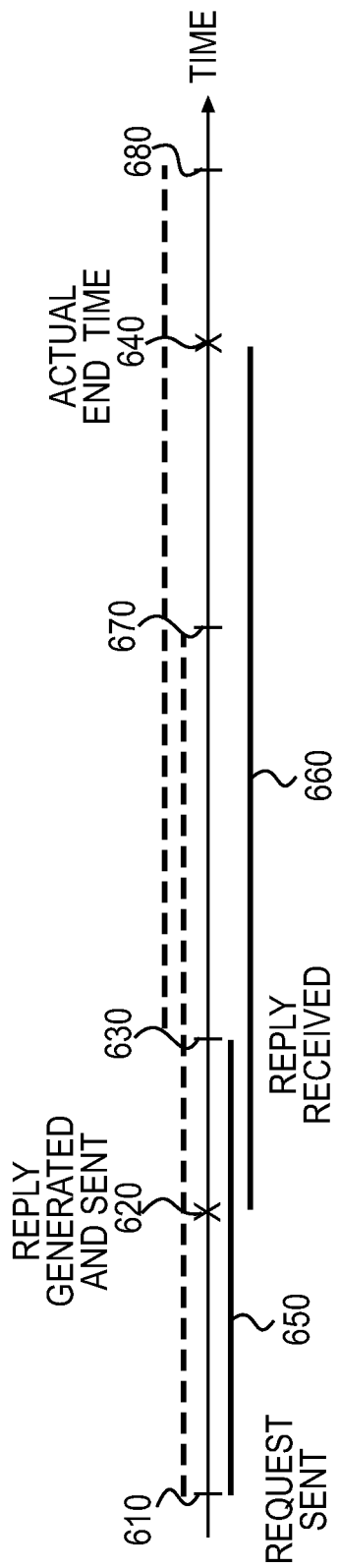
FIGS. 6, 7a and 7b are diagrams illustrating how errors may be introduced in time calculations.

It should also be recognized that communications between the media distribution outlet 100, local device 110, and display device 120 are not instantaneous. In operation, such communications will take some finite—though frequently short—period of time. FIG. 6 shows one exemplary embodiment by which communications delays may be accounted for in the present disclosure. As shown on FIG. 6, it may be assumed that after an association request is sent to the media distribution outlet 100 at time 610 (e.g., as described at step 410 on FIG. 4), there will be some time delay before the association encryption envelope is sent back to the local device 120 at time 620 (e.g., as described at step 470), and then some additional delay before the association encryption envelope is received on the display device 120 at time 630. This total time, between request at time 610 and receipt of reply at time 630, is shown as interval 650 on FIG. 6. This interval of delay, as will be illustrated shortly, provides an additional amount by which the overall accuracy of the system may be limited.

When the media distribution outlet 100 prepares the association encryption envelope at time 620, it may measure the real-time difference between the current time (time 620) and the end time of the media content described in the association request, shown as time 640. This interval is shown as time interval 660 on FIG. 6 and may be included in the association encryption envelope as the end time of the media content.

As noted above, interval 650 represents the overall delay time from the time an association request is sent by the local device 110 or display device 120 and the time an association encryption envelope is received back by the display device 120. However, the various components within the system are unlikely to know, with specificity, when particular events occur with respect to other components, and are therefore unlikely to be able to calculate intervals with absolute precision. For example, it will be understood that, when the media distribution outlet 100 prepares the association encryption envelope at time 620 that it will have no way of calculating or knowing when the envelope will be received by the display device 120, i.e., time 630. Similarly, the display device 120 will have no way of calculating or knowing when the envelope was sent by the media distribution outlet, i.e., time 620, but only that the envelope must have been sent (and, correspondingly, that time interval 660 must have been measured from) some point in time between points 610 and 630. As a result, no matter when the display device 120 might assume that interval 660 begins (i.e., regardless of when time 620 actually occurs between 610 and 630), the accuracy of the final computation will be limited by the duration of the interval 650.

It will be understood that there are a variety of methods by which the display device 120 might choose to deal with this margin of error, represented by interval 650. In one embodiment, the display device 120 might choose to calculate two values representing the earliest possible end time and the latest possible end time. As noted previously, the association encryption envelope may contain interval 660, which is the real-time difference between the time the association encryption envelope was created by the media distribution outlet 100 (time 620) and the end time of the media content described in the association request (time 640). Also as noted previously, it is assumed that time 620 occurred at some time between 610 and 630. Thus, as shown on FIG. 6, the earliest possible end time, shown as time 670, represents the end of an interval of time 660 starting at time 610; the last possible end time, shown as time 680, represents the end of an interval of time 660 starting at 630; and the difference between times 670 and 680, just as between 610 and 630, will be an interval of time 650.

For simplicity, the display device 120 may simply calculate the mid-point of the range 670 to 680 and use that mid-point as the proper end time. Thus, if range 650 (i.e., the delay) has value W, and interval 660 (i.e., the time remaining until the end time as calculated by the media distribution outlet 100) has a value of D, then the actual end of the content rental will happen sometime between D−W/2 and D+W/2. It will be understood, however, that the display device 120 need not use the mid-point of the range and that any other suitable calculations may be performed.

As noted previously, counter 129 drift may also introduce error into the enforcement of time restrictions. However, the actual, real-world drift of a particular timer is not necessarily a fixed, known value that can be calculated as, for example, a linearly-changing quantity. Therefore, in some embodiments it may be desirable to include within the association encryption envelope certain parameters regarding a maximum permissible error drift which, when approached, will prompt the device 120 to seek a forced association.

For example, a certain class of timing devices may be known to have a maximum drift (it being understood that the actual drift at any point in time will vary by actual device, ambient temperature, etc.). This maximum drift parameter may be expressed, for example, as a ratio, e.g., 0.01 seconds of drift/minute, and may be stored in the non-volatile memory 125 of the display device 120 as a characteristic of the counter 129. One having ordinary skill in the art will understand that, for different types of timers, the value of maximal drift may vary from less than 0.001 seconds of drift per minute for quartz-based timers to up to a few seconds per minute for non-quartz-based timers.

Figure 7A:
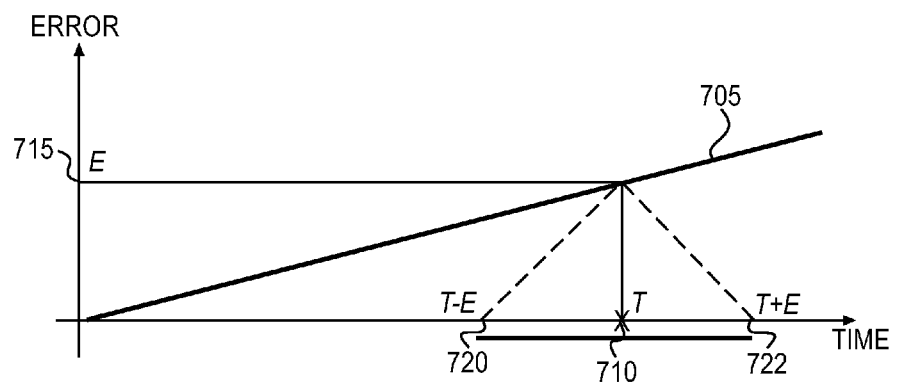

FIG. 7a illustrates one example by which the presence of counter 129 drift may affect the estimation of time interval duration. As noted above, each counter 129 is assumed to have a maximal drift rate (though it will be understood that the actual drift, at any point in time, may be less than or equal to this maximal drift rate). Using this maximal drift rate (e.g., the slope of line 705 on FIG. 7a), it is possible to calculate the maximum amount of drift error E (shown as error value 715) for any associated interval of time T (shown as time 710). For example, if the counter 129 has determined that 30 minutes have passed since it began keeping track of an interval, and the maximal drift rate is 1 second of drift per minute, then the maximum amount of error that may be caused by drift during that 30-minute period is 30 seconds (1 second of drift/minute×30 minutes=30 seconds). Then, it follows that the actual duration of the time interval calculated by counter 129 as T will be within the range of T−E (shown as time 720 on FIG. 7a) and T+E (shown as time 722 on FIG. 7a). Thus, in the foregoing example, while the counter 129 has determined that 30 minutes have elapsed, the actual elapsed time will be somewhere in the range of 29.5 minutes and 30.5 minutes.

Figure 7B:
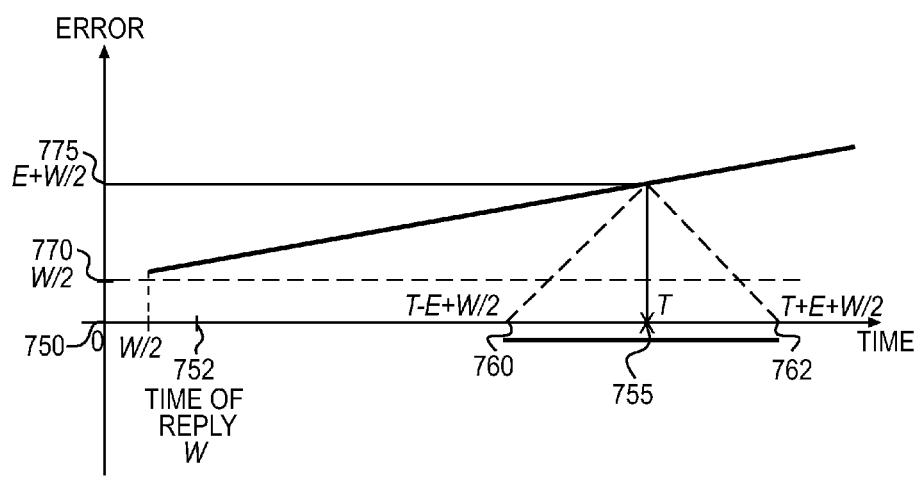

Since in practice both communication delays (e.g., interval 650 as shown on FIG. 6) and counter 129 drift will be present in almost any system, the actual error at any time is likely to be a function of both quantities. FIG. 7b illustrates one example by which the actual error can be calculated incorporating error attributable to both delay and drift. As shown on FIG. 7b, the association request may be sent at time 750, and the association encryption envelope may be received at time 752, creating a delay of W. Then, the second component of the error, due to drift, may be added to this, such that the range of total possible error at any time T (shown as time 755 on FIG. 7b) will be equal to the sum of W÷2 and the drift error E accumulated at that time T (the lower bound of this range shown as time 760 on FIG. 7b, and the upper bound of this range shown as time 762 on FIG. 7b).

For example, the delay W between an association request and receipt of an association encryption envelope (shown as time 752) may be 6 seconds. Furthermore, the maximum drift M of the counter 129 may be 1 second of drift/minute. In such a scenario, the error attributable to the delay would be W÷2, or 3 seconds. The error attributable to the drift E, over, for example, a one-week rental period T, would be 168 minutes (E=M×T, or 1 second of drift/minute×10,080 minutes/week, which is 10,080 seconds, or 168 minutes). Thus, the total error E attributable to both delay and drift would be 168 minutes and 3 seconds. As a result, while the counter 129 indicates that one week has elapsed, the actual elapsed time may fall anywhere within roughly 9,912 minutes or approximately 6 days, 21 hours and 12 minutes at the lower bound (e.g., time 760), and 10,248 minutes or approximately 7 days, 2 hours and 48 minutes at the upper bound (e.g., time 762).

Certain levels of error may not be acceptable to certain media distribution outlets 100 or media content providers. Thus, in some embodiments, media distribution outlets 100 or media content providers may set a maximum error in time interval measurements they are willing to accept. For example, the media distribution outlet 100 might be willing to accept up to half an hour of error (in one direction or the other, for a total range of one hour) on a one-week rental. As noted previously, this maximal error may be included in the association encryption envelope created by the media distribution outlet 100 at, e.g., step 420. In other embodiments, the maximal error might be some previously-agreed upon value known to both the display device 120 and the media distribution outlet 100—for example, 1 hour—which will apply to all media content provided by the outlet 100 to the device 120. Using this maximal error value, as well as the value of maximal counter 129 drift and the delay between a request sent to the media distribution outlet 100 and its response (as described with respect to FIG. 6), the display device 120 may determine the time intervals at which it should seek a forced association in order to stay within the content provider's drift requirements.

For example, because the maximum acceptable error in this scenario is half an hour, but the maximum possible error in the system over one week is just over 168 minutes, it may be desirable for the display device 120 to issue one or more forced association requests before the end of the one-week rental to limit the overall error in the system. In one embodiment, the time when a forced association request must be issued (value A) may be calculated as the maximum permissible drift time (value P) minus one-half the delay time (value W), divided by the maximum drift rate (value M), such that A=(P−W/2)÷M). Thus, in the foregoing example, P is half an hour, or 1800 seconds. Of the 1800 seconds of total permissible error, 3 seconds (or half of the 6-second delay W) may be subtracted out as attributable to communication delays with the media distribution outlet 100. The remaining 1797 seconds may then be attributable to counter 129 drift. At a maximum rate of 1 second of drift per minute, the counter 129 may hit the 1797 seconds of drift after 1797 minutes of elapsed time. Thus, prior to or at 1797 minutes of elapsed time, or 29 hours and 57 minutes, the display device 120 should issue a forced association request to bring itself back into the maximum drift parameters assigned in the association encryption envelope.

Figure 8:
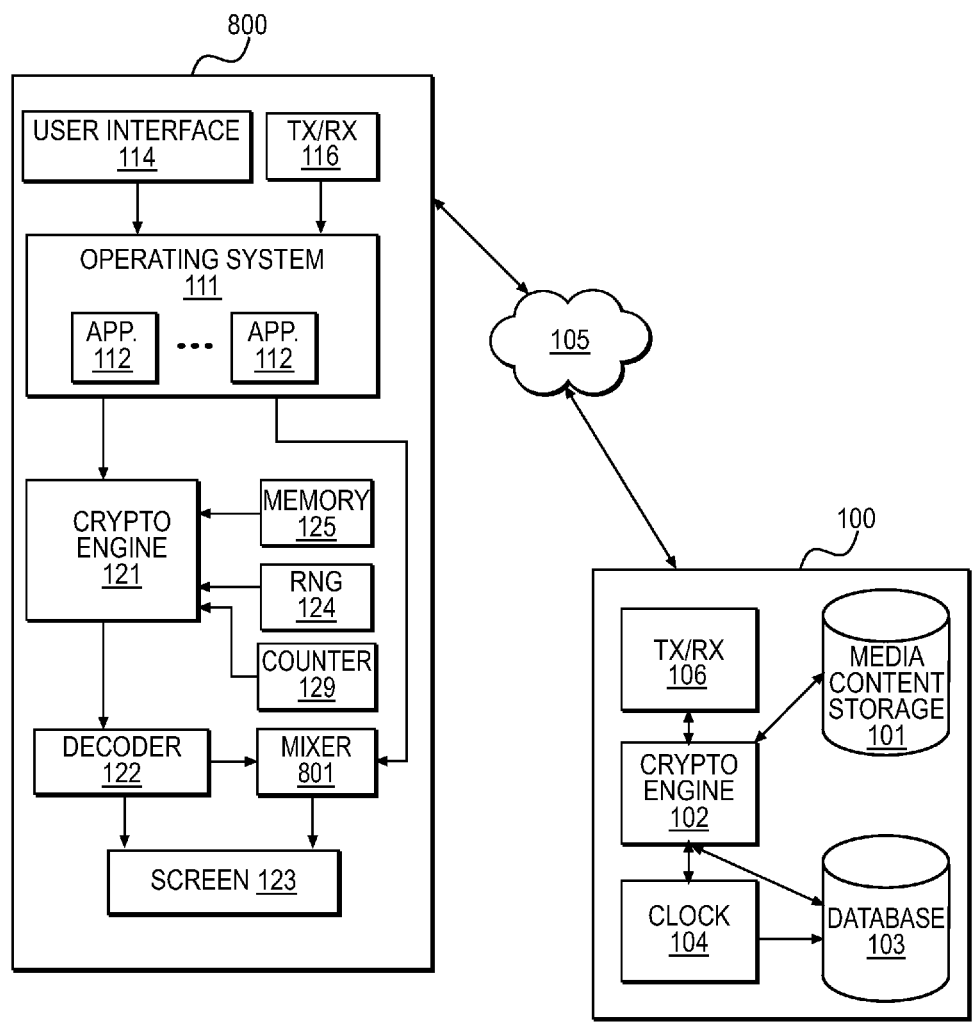
FIG. 8 is a block diagram of an exemplary system according to the present disclosure.

FIG. 8 shows yet another embodiment according to the present disclosure for systems in which the local device 110 and the display device 120 are packaged together (designated here as 800), such as, for example, in the case of a laptop, desktop computer, or a television set that has an operating system, storage, internet access, etc. To thwart operating system-based attacks on the security of the purchased content, decryption should not occur within the operating system 111 of the combined device 800. Rather, the combined device 800 should include a crypto engine 121, decoder 122, and private key 127 storage that are implemented in hardware. For example, a secure crypto processor may be used to implement these functions. If instead implemented in software, or a combination of software and hardware, the implementation should include equivalent separation/security guarantees as if it were implemented exclusively in hardware (for example, by using virtualization techniques).

To support situations in which the playback of the encrypted content does not occupy the whole screen, a mixer 801 may be provided. This mixer 801 allows the appropriate area of screen 123 to be occupied by the playback of the encrypted content (after appropriate decryption and decoding, of course), while the rest of the screen 123 remains under direct control of the operating system 111. In addition, to ensure security of the encrypted media content, the operating system 111 should not have the ability to read data from the portion of the screen 123 which is currently displaying video that was originally encrypted. For example, typically, the operating system 111 is able to read from the screen buffer which corresponds to screen 123. In this embodiment, the operating system 111 should not be able to read from the screen buffer which corresponds to screen 123, but still may be able to read from the screen buffer which corresponds to the data sent from the operating system 111 to the mixer 801. It should also be noted that in some embodiments mixer 801 may be able to perform image scaling to enable a particular image to fit the intended area.

One potential application of the embodiment shown on FIG. 8 (or other similar embodiments) may be to display a webpage including some protected video on the screen 123 of the display device 120. In this case, all the HTML content of the webpage could be rendered by an application running under operating system 111, the encrypted video stream or container could be handled by the crypto engine 121 and the decoder 122 (as described in detail above), and then it all could be mixed by mixer 801 to produce the final (potentially dynamic) image.

We note that the specific uses of symmetric and asymmetric encryption in the systems and methods described herein are but one possible embodiment. Depending on the overall system constraints and capabilities of the various apparatuses, it may be possible to substitute symmetric encryption for asymmetric encryption and vice versa. For example, the display device 120 might have its own secret symmetric key, rather than a public/private key pair. In this case, the database 103 of the media distribution outlet 100 would need to store the secret symmetric keys of display devices 120. While such an embodiment is within the scope of the present disclosure, care should be taken to ensure that the display device private keys stored in the database 103 are not compromised, either while they are being transmitted to the database 103 or while stored in the database 103. Similarly, rather than encrypting media content with a symmetric key assigned to each user/content pair, media content could be encrypted with a public key associated with that user/content pair. Which specific combination of symmetric key or public/private key cryptography to use to implement a system according to the present disclosure is a matter of implementation choice governed by issues, such as, processing power available to perform encryption/decryption and the importance of speed in accomplishing encryption/decryption.

It should also be noted that whenever encryption of some content with an asymmetric key (i.e., a public or private) key is mentioned within present description, it can be either implemented as direct encryption with the asymmetric key, or, alternatively, by generating a temporary crypto-safe symmetric key, encrypting content with this temporary symmetric key, and encrypting the temporary symmetric key with an asymmetric key. Then, the encrypted content will include both content encrypted with the temporary symmetric key, as well as the temporary symmetric key encrypted with the asymmetric key. This is a standard technique in cryptography used for optimization purposes, when, for example, it may not be desirable to encrypt large amounts of data using asymmetric encryption because of limited system resources (it being understood that asymmetric encryption is generally slower and more resource-intensive than symmetric encryption).

The foregoing discussion has focused on techniques for deterring unauthorized access to media content at the logical level. As such, the foregoing discussion has not focused on methods of preventing attacks at the physical level, such as by disassembling the display device 120 and reading data from the physical connectors, especially those coming to screen 123. However, many known techniques can be used to make physical attacks more difficult, including both tamper-resistant and tamper-responding technologies.

Certain special measures may be taken to prevent attacks aimed to circumvent re-programming of the display device 120; such special measures might include, among other things, a) not allowing re-programming of the display device 120 with a new program unless it is digitally signed (with a certificate or public key for such signature being stored within the display device 120), b) to keep crypto-sensitive operations, as well as the private key 127 and the counter 129, within a non-reprogrammable portion of non-volatile memory 125, with hardware restricting the re-programmable portion from accessing the private key 127, any symmetric key, or the counter 129 in any way except as described herein, and/or c) to implement cryptography, decoding and timekeeping operations completely in hardware. This hardware may be additionally physically secured. As a result, it would be difficult for a user to circumvent the time restrictions provided in an association encryption envelope or to otherwise misuse the media content.

It will be understood that, though the present discussion has focused on communication with a single media distribution outlet 100, devices according to the present disclosure may interact with multiple different outlets. To expedite processing of user requests, the operating system 111 may remember from which media distribution outlet it has purchased certain content, and direct association requests for that content to the appropriate outlet 100.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (Soc)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A method for distributing media content for restricted use, comprising:
   receiving a request for the media content from a user device, the request comprising a content identifier identifying the media content, a user identifier identifying a user requesting the media content, a display device identifier identifying a display device coupled to the user device, a nonce and a requested time period for the media content;
   determining that the user is authorized to receive the media content;
   generating a first time duration restriction associated with the user and the media content, the first time duration restriction being generated based on the requested time period to represent a rental period of the media content to the display device;
   generating, on a media distribution center, an association encryption envelope to hold the nonce and the first time duration restriction, wherein the association encryption envelope includes a symmetric key to encrypt the media content and the symmetric key is associated with a combination of the user identifier and the content identifier, and wherein the association encryption envelope further includes parameters regarding a maximum permissible error drift which, when approached, prompts the display device to seek a forced association;
   encrypting the media content; and
   transmitting the encrypted media content and the association encryption envelope to the user device.

2. The method of claim 1, further comprising:
   storing a second time duration restriction associated with the user and the media content, the second time duration restriction being generated based on the requested time period;
   searching a database to locate a public key associated with the display device; and
   encrypting the association encryption envelope with the public key before transmitting the association encryption envelope to the user device.

3. The method of claim 2, further comprising verifying a signature attached to the request is signed by the display device, wherein the signature is verified using the public key associated with the display device.

4. The method of claim 2, wherein the user identifier identifying the user requesting the media content identifies a user account associated with the user.

5. The method of claim 2, wherein determining that the user is authorized to receive the media content includes determining the user has appropriate privileges to access the media content.

6. The method of claim 5, wherein the appropriate privileges include a parental control privilege.

7. The method of claim 2, wherein the first time duration restriction is calculated based on a time zone of the user device and expressed as an interval of time, and wherein the stored second time duration restriction is stored in real-world time.

8. The method of claim 2, wherein the stored second time duration restriction includes a start time and a duration, or a start time and an end time.

9. The method of claim 2, further comprising receiving a dissociation request from the user device to dissociate the media content from the display device.

10. The method of claim 2, further comprising receiving a temporary association request to associate the media content with another display device for a short time period that satisfies the second time duration restriction.

11. The method of claim 2, wherein the request for the media content is a request for a renewable time-limited license for the media content.

12. The method of claim 11, wherein the association encryption envelope includes an indication that the association is renewable and the media content is associated with only one display device for the user at any time.

13. A method for requesting media content for restricted use, comprising:
   receiving user input indicating a desire for the media content;
   generating a request for the media content, the request comprising a content identifier identifying the media content, a user identifier identifying a user requesting the media content, a display device identifier identifying a display device coupled to the user device, a nonce received from the display device and a requested time period for the media content;
   transmitting the request to a media distribution center;
   receiving an association encryption envelope for the requested media content from the media distribution center, the association encryption envelope containing a time duration restriction representing a rental period of the requested media content to the display device, wherein the association encryption envelope is generated on the media distribution center and includes a symmetric key to encrypt the media content, and wherein the symmetric key is associated with a combination of the user identifier and the content identifier and wherein the association encryption envelope further includes parameters regarding a maximum permissible error drift which, when approached, prompts the display device to seek a forced association; and
   forwarding the received association encryption envelope to the display device.

14. The method of claim 13, further comprising sending the request to the display device for the request to be digitally signed by the display device with a digital signature, wherein the request transmitted to the media distribution center is accompanied by the digital signature.

15. The method of claim 14, wherein signing the request is restricted by a pre-defined rate within a certain time period.

16. The method of claim 13, further comprising receiving user input to dissociate the media content from the display device and sending a request to the media distribution center to dissociate the media content from the display device.

17. The method of claim 16, wherein the request to dissociate the media content from the display device is accompanied by a request to associate the media content with another display device.

18. The method of claim 13, further comprising receiving the media content in an encrypted format from the media distribution center and forward the media content to the display device in the encrypted format.

19. The method of claim 18, further comprising controlling the display device to display the media content on the display device according to the time duration restriction.

20. A method for receiving time restrictions on a device, comprising:
   transmitting to a controlling device a first nonce;
   storing a counter value of a counter representing a time of when the first nonce is transmitted;
   receiving, from the controlling device, an association encryption envelope comprising at least a second nonce and a first time restriction expressed as a first time interval from the time when the first nonce is transmitted until an end time, wherein the association encryption envelope includes a symmetric key to encrypt a media content and the symmetric key is associated with a combination of a user identifier and a content identifier;
   performing operations on an encrypted media content in conformance to the first time restriction; and
   determining time intervals at which the display device seeks forced associations to stay within a drift requirement of a media distribution center for authorized media playback.

21. The method of claim 20, wherein the first nonce and the second nonce are the same.

22. The method of claim 20, wherein the operations include decryption, decoding and displaying the encrypted media content received from the controlling device.

23. The method of claim 22, wherein the association encryption envelope contains a symmetric key used for encryption of the encrypted media content.

24. The method of claim 20, wherein the controlling device is a smartphone, desktop computer, a laptop, or a set-top box and the display device is a television set or a monitor.

25. The method of claim 20, wherein the associated encryption envelope is encrypted using a public key of the display device before being sent to the display device and decrypted using a private key of the display device after being received at the display device.

26. The method of claim 20, further comprising sending new association requests from time to time to obtain a second time restriction expressed as a second time interval.

27. The method of claim 20, wherein the drift requirement is provided in the association encryption envelope or is a previously-agreed upon value.

28. A media distribution server, comprising:
   a communication interface configured to receive a request for media content from a user device, wherein the request comprises a content identifier identifying the media content, a user identifier identifying a user requesting the media content, a display device identifier identifying a display device coupled to the user device, a nonce and a requested time period for the media content;
   a media content storage storing the media content; and
   a crypto engine coupled to the communication interface and the media content storage, the crypto engine configured to:
   obtain a symmetric key associated with the user and media content;
   retrieve the requested media content from the media content storage;
   encrypt the media content retrieved from the media content storage using the symmetric key when the user is authorized to receive the media content;
   generate a first time duration restriction associated with the user and the media content, the first time duration restriction being generated based on the requested time period to represent a rental period of the media content to the display device;
   generate an association encryption envelope to hold the symmetric key, the first time duration restriction and the nonce, wherein the symmetric key is associated with a combination of the user identifier and the content identifier, and wherein the association encryption envelope further includes parameters regarding a maximum permissible error drift which, when approached, prompts the display device to seek a forced association;
   obtain a public key associated with the display device;
   encrypt the association encryption envelope with the public key; and
   transmit the encrypted media content and the association encryption envelope to the user device via the communication interface.

29. The media distribution server of claim 28, wherein the crypto engine is further configured to verify a signature attached to the request is signed by the display device, wherein the signature is verified using the public key associated with the display device.

30. The media distribution server of claim 29, wherein the first time duration restriction is calculated based on a time zone of the user device and expressed as an interval of time, and wherein the crypto engine is further configured to store a second time duration restriction associated with the user and the media content, the second time duration restriction being generated based on the requested time period and stored in real-world time.

31. The media distribution server of claim 29, wherein the request for the media content is a request for a renewable time-limited license for the media content.

32. The media distribution server of claim 31, wherein the association encryption envelope includes an indication that the association is renewable and the media content is associated with only one display device for the user at any time.

33. An apparatus, comprising:
a user input device to receive user input indicating a desire for media content;
a computer processor configured to generate a request for the media content, the request comprising a content identifier identifying the media content, a user identifier identifying a user requesting the media content, a display device identifier identifying a display device coupled to the apparatus, a nonce received from the display device and a requested time period for the media content; and
a communication interface configured to:
transmit the request to a media distribution center;
receive an association encryption envelope for the requested media content from the media distribution center, the association encryption envelope containing a time duration restriction representing a rental period of the requested media content to the display device, wherein the association encryption envelope is generated on the media distribution center and includes a symmetric key to encrypt the media content, and wherein the symmetric key is associated with a combination of the user identifier and the content identifier, and wherein the association encryption envelope further includes parameters regarding a maximum permissible error drift which, when approached, prompts the display device to seek a forced association; and
forward the received association encryption envelope to the display device.

34. The apparatus of claim 33, wherein the computer processor is further configured to send the request to the display device for the request to be digitally signed by the display device with a digital signature, wherein the request transmitted to the media distribution center is accompanied by the digital signature.

35. The apparatus of claim 33, wherein the computer processor is further configured to receive the media content in an encrypted format from the media distribution center and forward the media content to the display device in the encrypted format.

36. The apparatus of claim 33, wherein the computer processor is further configured to control the display device to display the media content on the display device according to the time duration restriction.

37. An apparatus, comprising:
a communication interface configured to couple to a controlling device to transmit a first nonce and to receive an association encryption envelope, the association encryption envelope comprising at least a second nonce and a first time restriction expressed as a first time interval, wherein the symmetric key is associated with a combination of a user identifier and a content identifier;
a counter;
a storage configured to store a value of the counter representing a time of when the first nonce is transmitted; and
an engine configured to perform operations on an encrypted media content according to the first time restriction and determine time intervals at which the apparatus seeks forced associations to stay within a drift requirement of a media distribution center for authorized media playback.

38. The apparatus of claim 37, wherein the first nonce and the second nonce are the same.

39. The apparatus of claim 38, wherein the engine is a crypto engine and the operations include decryption, decoding and displaying the encrypted media content received from the controlling device.

40. The apparatus of claim 39, wherein the association encryption envelope contains a symmetric key used for encryption of the encrypted media content.

41. The apparatus of claim 37, wherein the controlling device is a smartphone, desktop computer, a laptop, or a set-top box and the apparatus is a television set or a monitor.

42. The apparatus of claim 37, wherein the associated encryption envelope is encrypted using a public key of the apparatus before being sent to the apparatus and decrypted using a private key of the apparatus after being received at the apparatus.

* * * * *